United States Patent
Phan

(10) Patent No.: US 6,643,609 B2
(45) Date of Patent: Nov. 4, 2003

(54) PERFORMANCE MEASUREMENT FOR EMBEDDED SYSTEMS

(75) Inventor: Michael Huy Phan, Antelope, CA (US)

(73) Assignee: Sharewave, Inc, El Dorado Hills, CA (US)

( * ) Notice: Subject to any disclaimer, the term of this patent is extended or adjusted under 35 U.S.C. 154(b) by 0 days.

(21) Appl. No.: 10/146,868

(22) Filed: May 15, 2002

(65) Prior Publication Data

US 2002/0188889 A1 Dec. 12, 2002

Related U.S. Application Data

(60) Provisional application No. 60/291,784, filed on May 16, 2001.

(51) Int. Cl.[7] ............................................. G06F 13/00
(52) U.S. Cl. .................. 702/182; 702/178; 702/179; 702/183; 702/189
(58) Field of Search .................. 702/57, 128, 176, 702/177, 178–179, 182, 183, 185–189; 705/27, 35; 370/229, 389; 709/246, 203

(56) References Cited

U.S. PATENT DOCUMENTS

| | | | |
|---|---|---|---|
| 5,537,541 A | | 7/1996 | Wibecan |
| 5,845,310 A | * | 12/1998 | Brooks .................. 711/13 |
| 6,079,032 A | * | 6/2000 | Peri .................. 714/38 |
| 6,092,180 A | * | 7/2000 | Anderson et al. ........... 712/200 |
| 6,430,659 B1 | * | 8/2002 | Cossmann et al. .......... 711/147 |
| 6,502,133 B1 | * | 12/2002 | Baulier et al. .............. 709/224 |

FOREIGN PATENT DOCUMENTS

| | | |
|---|---|---|
| EP | 0 881 574 A1 | 12/1998 |
| EP | 0 992 905 A2 | 4/2000 |

OTHER PUBLICATIONS

IBM Technical Disclosure Bulletin; Processor Performance Monitoring with Depiction of the Efficiency of Bus Utilization and Memory Accesses of Superscalar Microprocessor; vol. 40, No. 01; Jan. 1997; XP 000686104; pp. 67–68; IBM Corporation, New York, NY, US.

* cited by examiner

Primary Examiner—Marc S. Hoff
Assistant Examiner—Felix Suarez
(74) Attorney, Agent, or Firm—James J. Murphy, Esq.; Winstead Sechrest & Minick PC

(57) ABSTRACT

An embedded system includes a microprocessor and performance measuring logic coupled to the microprocessor and configured to record selected performance metrics. In the given routine. In general, a counter is configured to record statistics for each of the performance metrics, and the counters may be controlled using a programmable mask, which is included in a memory coupled to the microprocessor. Based on these metrics, designers may fine-tune software for the embedded system.

17 Claims, 2 Drawing Sheets

PERFORMANCE MEASUREMENT FOR EMBEDDED SYSTEMS

This application claims benefit of 60/291,784 filed May, 16, 2001.

FIELD OF THE INVENTION

The present invention relates to the field of performance measurement using designated logic within embedded systems.

BACKGROUND

Embedded systems are devices used to control, monitor or assist the operation of equipment, machinery or larger systems. The term "embedded" reflects the fact that these components are an integral part of the overall system. In other words, the system incorporates its own embedded controller rather than relying upon a general-purpose computer to control the operation of a system.

All embedded systems are computer or control systems. Some of them are however very simple devices as compared with a general-purpose personal computer. The simplest devices each consist of a single microprocessor or microcontroller, which may be packaged with other chips in a hybrid or application specific integrated circuit (ASIC). The ASIC input comes from a detector or sensor and the ASIC output goes to a switch or activator which may, for example, start or stop the operation of a machine or perform some other operation.

An ASIC is a chip that is custom designed for a specific application rather than a general-purpose chip such as a microprocessor. The use of ASICs improve performance over general-purpose CPUs, because ASICs are "hardwired" to perform a specific task(s) and do not incur the overhead of fetching and interpreting stored instructions. An ASIC chip performs an electronic operation as fast as possible, providing, of course, that the circuit design is efficiently designed.

The very simplest embedded systems are each capable of performing only a single function or set of functions to meet a single predetermined purpose. In the more complex systems, the function of the embedded system is determined by an application program, which enables the embedded system to do things for a specific application. The ability to have different operating programs allows the same system to be used for a variety of different purposes. In some cases, a microprocessor may be designed in such a way that application software for a particular purpose may be added to the basic software in a second process, that may not be further changed. This particular application software is sometimes referred to as firmware.

Typically, an embedded system is housed on a single microprocessor board with the programs stored in ROM. Virtually all appliances that have a digital interface, such as watches, microwaves, VCRs, cars, etc., utilize embedded systems. Some embedded systems include an operating system, but many of them are so specialized that the entire logic may be implemented by a single program.

Firmware designers often have a need to fine-tune their software to a given target platform (e.g., a target embedded system). Such fine-tuning often involves the need to modify software in order to try and achieve desired results.

One such technique for fine-tuning the software involves the use of a benchmarking scheme for measuring performance in an embedded system. For example, the Dhrystone benchmarking software program (hereafter "Dhrystone"), which was first developed by R. P. Wecker in 1984, is a benchmark test used to test the performance of embedded systems. Dhrystone is compact, widely available in the public domain, and easy to use. Dhrystone compares the performance of the processor under benchmark to that of a reference machine. Significant weaknesses exist with the use of Dhrystone. The results from Dhrystone tend to reflect the performance of the C compiler and libraries, more so than the performance of the processor itself.

The Dhrystone code is very compact (e.g., being of the order of around 100 high-level language statements and occupying just 1–1.5 kB of compiled code). Due to the small sized code, memory access beyond the cache is not exercised. Thus, Dhrystone simply tests the performance of the integer core. However, most processor cores include embedded cache memories, and the overall memory hierarchy and the way that the memory is managed heavily affect system design and performance. Benchmarking tools, such as Dhrystone, do not measure such improvements to memory management and system performance. The present invention recognizes the need and desire for a mechanism to assist in measuring actual microprocessor performance of an embedded system and not merely determine whether benchmarks for the embedded system have been achieved for certain criteria.

SUMMARY OF THE INVENTION

In one embodiment, the invention is a method for measuring an embedded system performance. The method includes initiating the embedded system. The method also includes loading instructions at the embedded system for reading a performance measurement mask. The method also includes executing the instructions and thereby causing the performance measurement mask to be read. The method further includes analyzing the performance measurement mask configuration to determine performance metrics to be measured. Moreover, the method includes performing a plurality of performance monitoring tasks on the embedded system according to the performance metrics to be measured. The performance metrics may be one or more the following exemplary metrics: overall execution time for a particular routine, number of instruction cycles executed in the particular routine, number of cache hits in the given routine; total number of memory reads in the given routine, total number of memory accesses (reads and writes) in the given routine, number of control bus read cycles in the given routine, number of control bus cycles (reads and writes) in the given routine, number of non-cacheable read cycles in the given routine, and total number of non-cacheable access cycles (reads and writes) in the given routine. Preferably, the performance metrics are recorded according to the status of control flags in a mask included within the embedded system. Based on these metrics, designers may fine-tune software for the embedded system.

In another embodiment, the invention is an embedded system that includes a microprocessor and performance measuring logic coupled to the microprocessor and configured to record selected performance metrics. The performance metrics may be one or more of the following: overall execution time of a particular routine, number of instruction cycles executed in the particular routine, number of cache hits in the given routine; total number of memory reads in the given routine, total number of memory accesses (reads and writes) in the given routine, number of control bus read cycles in the given routine, number of control bus cycles (reads and writes) in the given routine, number of non-cacheable read cycles in the given routine, and total number of non-cacheable access cycles (reads and writes) in the given routine. In general, a counter is configured to record statistics for each of the performance metrics, and the counters may be controlled using a programmable mask, which is included in a memory coupled to the microprocessor.

DESCRIPTION OF THE DRAWINGS

The present invention is illustrated by way of example, and not limitation, in the figures of the accompanying drawings in which like reference numerals refer to similar elements and in which.

DETAILED DESCRIPTION

A scheme for measuring actual performance in an embedded system is disclosed herein. Although discussed with reference to certain illustrated or exemplary embodiments, upon review of this specification, those of ordinary skill in the art will recognize that the present invention may find application in a variety of systems. Therefore, in the following description the illustrated embodiments should be regarded as exemplary only and should not be deemed to be limiting in scope. Also, specific performance metrics are discussed in association with the present invention. However, the present invention is not limited to measuring these specific metrics, and any suitable metric may be measured in accordance with the present invention.

Figure 1:
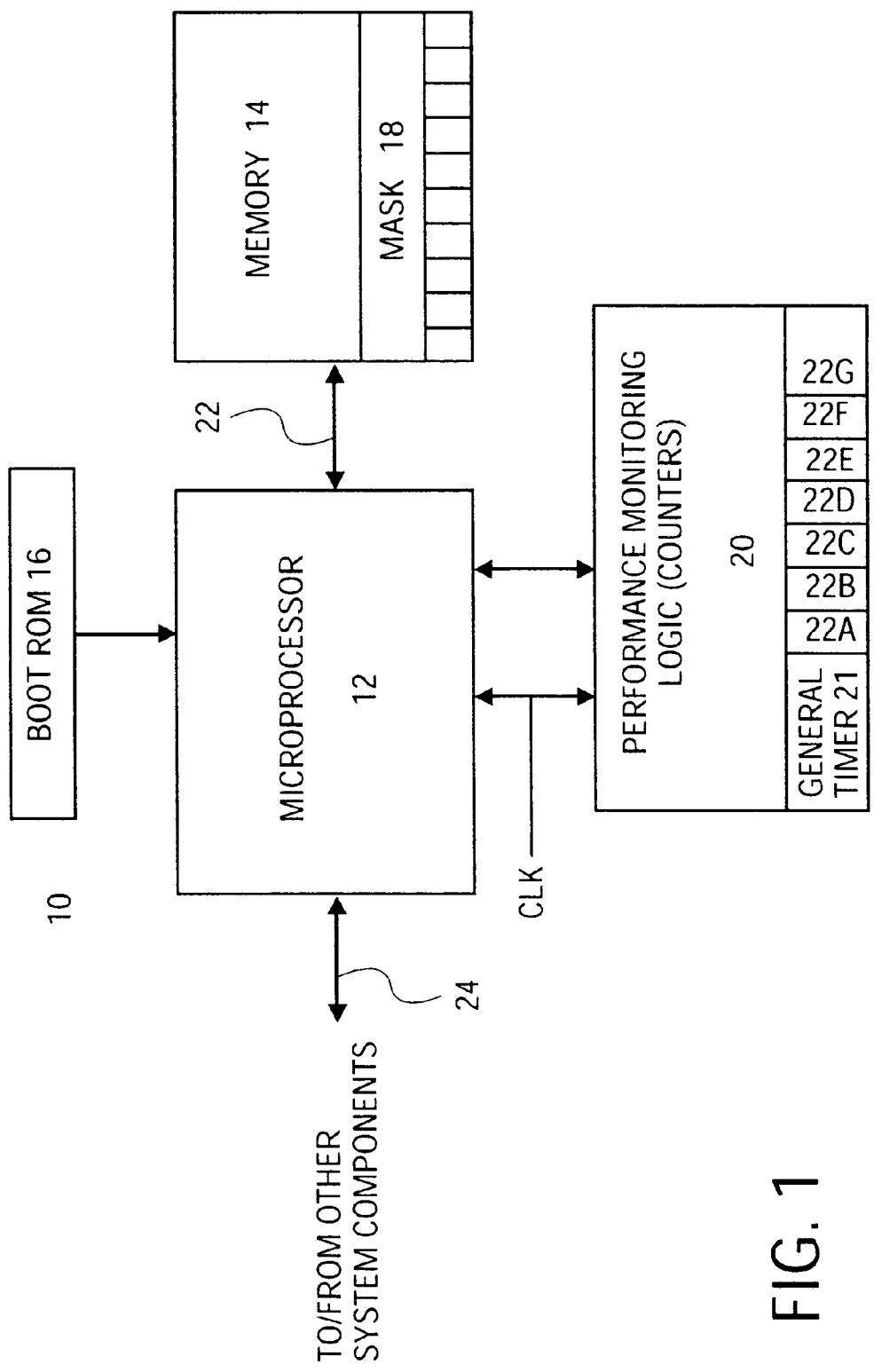
FIG. 1 illustrates a portion of an embedded system, which includes performance monitoring logic configured in accordance with an embodiment of the present invention.

FIG. 1 illustrates a portion of an embedded system 10, which includes a microprocessor or microcontroller 12. In one exemplary embodiment, the microprocessor 12 is an ARM microprocessor. The present invention may be used with any microprocessor or microcontroller, such as an x-86 type microprocessor, a MIPS processor, a RISC processor or any other type of microprocessor or microcontroller. The microprocessor 12 is coupled to any of a variety of system components (e.g., such as input/output components), which are not shown in detail because the make up of these components is not critical to the present invention.

Also, a memory system 14 is coupled to the microprocessor 12. Memory system 14 may be volatile memory, such as a read-write memory (RAM). Usually, a non-volatile memory 16 (often referred to as a boot ROM) will be provided as well. The non-volatile memory 16 stores the start-up program (or boot program) for microprocessor 12. Performance monitoring logic 20 is coupled to the microprocessor 12, usually along the processor bus or the memory bus if a separate memory bus exists.

In one exemplary embodiment, performance metrics may be one or more of the following exemplary metrics: overall execution time of a particular routine, number of instruction cycles executed in the particular routine, number of cache hits in the given routine; total number of memory reads in the given routine, total number of memory accesses (reads and writes) in the given routine, number of control bus read cycles in the given routine, number of control bus cycles (reads and writes) in the given routine, number of non-cacheable read cycles in the given routine, and total number of non-cacheable access cycles (reads and writes) in the given routine. In general, corresponding counters 22a to 22g are configured to record statistics for each of the performance metrics, and counters 22a to 22g may be controlled using a programmable mask, which is included in memory system 14 coupled to the microprocessor. In the exemplary embodiment, counters 22a to 22g may also be controlled using a general timer 21 included in performance monitoring logic 20.

The performance monitoring logic 20 includes the general timer 21, a cycle counter 22a, a hit rate counter 22b, a memory read counter 22c, memory access counter 22d, a control bus read counter 22e, a non-cacheable read counter 22f, and a non-cacheable access counter 22g. General timer 21 may also track the time it takes to complete or perform an operation or a group of operations. In one exemplary embodiment, the operations include an instruction cycle executed in a routine, a cache hit in a routine, a memory read in a routine, a memory write in a routine, a control bus read in a routine, a control bus write in a routine, a non-cacheable read in a routine, and a non-cacheable write in a routine.

General timer 21 and counters 22a to 22g each may be used in two different modes. In the first mode, the general timer is set for a specific period of time and begins counting down until zero. Until the general timer reaches zero, all of the counters 22a to 22g in monitoring logic 20 will be incremented for each of their corresponding operations. In the second mode, mask 18 is utilized to enable and disable counters 22a to 22g for a corresponding specified set of instructions (e.g. software/firmware routine). The second mode allows a designer to utilize mask 18 and counters 22a to 22g to measure the performance of specific routines. Mask 18 is further explained below.

Cycle counter 22a tracks the number of instruction cycles executed, which will be updated for each executed instruction cycle. Cycle counter 22a in one exemplary embodiment is a thirty-two (32) bit register. These bits are-read only and in HEX format. These bits reflect the number of LOAD/STORE cycles that are executed on a memory bus 22 and a control bus 24 over a period of time specified in general timer 21 or the number of LOAD/STORE cycles executed in a specific routine. The LOAD/STORE cycles tracked, include the combination of all memory bus read/write cycles and all control bus read/write cycles.

Hit rate counter 22b tracks the number of cache hits in a given routine, which is updated for each cache hit. Hit rate counter 22b is utilized to determine performance of cache memory in an embedded systems. When data is found in the cache, a cache hit occurs, and the effectiveness of a cache memory is determined by the hit rate. Hit rate counter 22b in one exemplary embodiment is a thirty-two (32) bit register. These bits are read-only and in HEX format. These bits reflect the number of memory read cycles that hit the internal cache over a specified period of time or over a number of memory read cycles that hit the internal cache during a specific routine.

Memory read counter 22c tracks the total number of memory reads in a given routine, which is updated for each memory read. Memory read counter 22c in one exemplary embodiment is a thirty-two (32) bit register. These bits are read-only and in HEX format. These bits reflect the number of read cycles that are executed on the memory bus over a specified period of time or the number of read cycles executed on the memory bus during a specific routine. A memory read cycle is a series of operations that take place on the memory bus to read a memory.

Memory access counter 22d tracks the total number of memory accesses (reads and writes) in a given routine, which is updated for each memory access. Memory access counter 22d in one exemplary embodiment is a thirty-two (32) bit register. These bits are read-only and in HEX format. These bits reflect the number of memory cycles that are executed on the memory bus over a specified period of time or the number of memory cycles that are executed on the memory bus during a specific routine. A memory cycle is a series of operations that take place over the memory bus to read from or write to memory.

Control bus read counter 22e tracks the number of control bus read cycles in a given routine, which is updated for each control bus read. Control bus read counter 22e in one exemplary embodiment is a thirty-two (32) bit register. These bits are read-only and in HEX format. These bits reflect the number of read cycles that are executed on the control bus over a specified period of time or the number of read cycles that are executed on the control bus during a specified routine. The control bus is the physical connections that carry control information between the CPU and other devices within the computer. For example, one line of the bus is used to indicate whether the CPU is currently reading from or writing to main memory.

Non-cacheable read counter 22f tracks the number of non-cacheable read cycles in a given routine, which is updated for each non-cacheable read. Non-cacheable read counter in one exemplary embodiment is a thirty-two (32) bit register. These bits are read-only and in HEX format. These bits reflect the number of read cycles that are executed on the memory bus to access a non-cacheable memory over a specified period of time or during a specific routine.

Control bus access counter 22g tracks the number of control bus cycles (reads and writes) in a given routine, which is updated for each control bus cycle. Control bus access counter 22g in one exemplary embodiment is a thirty-two (32) bit register. These bits are read-only and in HEX format. These bits reflect the number of read/write cycles that are executed on the control bus over a specified period of time or the number of read/write cycles that are executed on the control during a specific routine.

Figure 2:
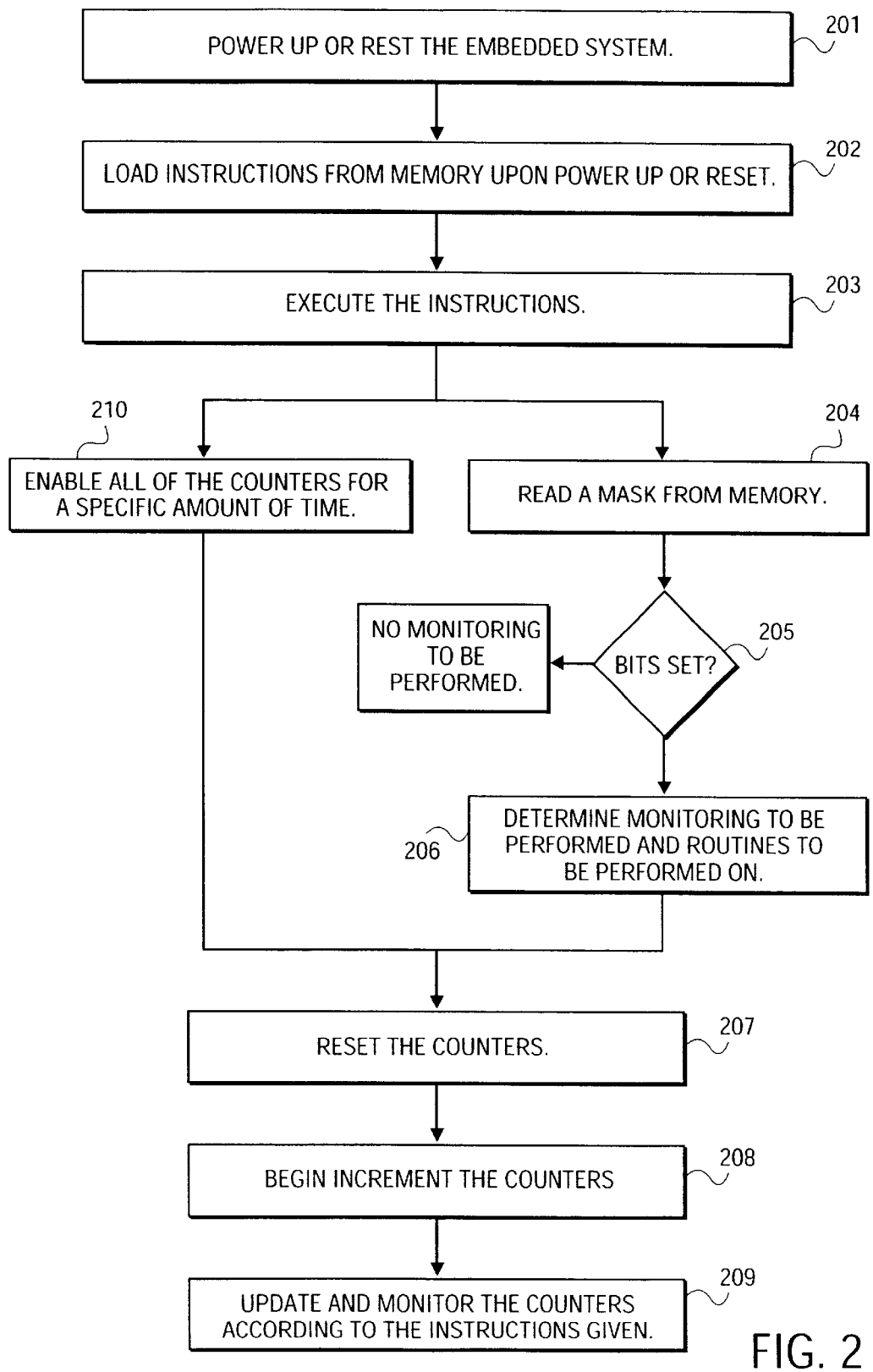
FIG. 2 illustrates a method for monitoring performance in an embedded system.

FIG. 2 illustrates an exemplary method for measuring performance of an embedded system according to the invention. Upon power up or reset at block 201, the microprocessor 12 loads instructions from the non-volatile memory 16 at block 202 and begins to execute the instructions at block 203. The instructions may be the firmware or a portion thereof for embedded system 10. In the present case, one of those instructions may be to read a portion of memory 14 at a particular point in time at block 204. The portion of memory 14 being read may be referred to as a performance measurement mask 18 (e.g., see FIG. 1). Mask 18 may be set by user configuration. In other cases, mask 18 or instructions for setting bits within mask 18 may be incorporated as part of the instruction set in non-volatile memory 16.

Mask 18 is a set of bits, which may or may not be contiguous and may be set depending upon whether or not the embedded system 10 is to perform certain performance monitoring tasks. By setting particular bits of mask 18, a designer instructs embedded system 10 to perform certain tasks to collect performance monitoring data which is then used to assist in the firmware development process. The designer uses the mask to enable and disable counters 22a to 22g to correspond with a specific set of software/firmware instructions (e.g. routine/routines). For example, a designer may want to check the performance for a specific read routine and therefore would set mask 18 (e.g. using Green Hills ARM development tools) so that microprocessor 12 increments the counters in performance monitoring logic 20 only during the execution of the specified read routine.

Referring back to FIG. 2, a determination is made as to whether any bits in mask 18 are set at block 205. If bits are set in mask 18, then microprocessor 12 analyzes mask 18 at block 206 to determine the monitoring task(s) to be performed and the routine(s) the monitoring tasks(s) are to be performed on. After determining the routine(s) and task(s), counters 22a to 22g are reset at block 207. Microprocessor 12 will begin incrementing counters 22a to 22g for each corresponding operation performed at block 208. Microprocessor 12 will continue to monitor the operations and update counters 22a to 22g according to the instructions (e.g. time limit) at block 209.

Instead of using a mask to control the counters, the instructions read at block 203 may be instructions 210 to enable counters 22a to 22g for a specific amount of time. The specified amount of time is set in General Timer 21. The instructions at block 210 are different than those issued at block 204 because performance is monitored according to a specific routine instead of monitoring for a specified amount of time.

From the statistics provided by counters 22a to 22g, designers are able to fine-tune firmware to work with the embedded system 10 and improve overall performance. Thus, a scheme for performance monitoring in embedded systems has been described.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1 may be integrated into components or may be subdivided into components. Moreover, the blocks of FIG. 2 represent portions of a method which, in some embodiments, may be reordered or may be organized in parallel rather than in a linear or step-wise fashion. The present specification and figures are accordingly to be regarded as illustrative rather than restrictive.

What is claimed is:

1. A method of measuring actual performance in an embedded system including a processor and a memory, the method comprising:

coupling performance monitoring logic to the microprocessor;

reading a bit mask from the memory, wherein each bit of the bit mask corresponds to a monitoring task of the performance monitoring logic;

enabling a plurality of monitoring tasks in the performance monitoring logic responsive to the setting of bits in the bit mask; and tracking performance metrics of the embedded system by utilizing counters in the performance monitoring logic to track occurrences of selected operations.

2. The method of claim 1 further comprising selectively resetting the counters before tracking the performance metrics.

3. The method of claim 1, wherein the performance metrics are tracked over a designated period of time.

4. The method of claim 1, wherein the bit mask is a designated number of bits in the memory.

5. The method of claim 4, wherein the memory includes a volatile memory.

6. The method of claim 1, wherein the mask is set by user configuration.

7. The method of claim 1, wherein the selected operations comprise one or more of the following: overall execution time of a particular routine, number of instruction cycles executed in the particular routine, number of cache hits in the given routine; total number of memory reads in the given routine, total number of memory accesses (reads and writes) in the given routine, number of control bus read cycles in the given routine, number of control bus cycles (reads and writes) in the given routine, number of non-cacheable read cycles in the given routine, and total number of non-cacheable access cycles (reads and writes) in the given routine.

8. An embedded system comprising:

a microprocessor;

a memory including a bit mask; and performance measuring logic coupled to the microprocessor and configured to track selected performance metrics by utilizing counters to track occurrences of microprocessor operations, wherein the performance metrics to be tracked are determined responsive to the bit mask.

9. The embedded system of claim 8, wherein the performance metrics comprise one or more of the following: overall execution time of a particular routine, number of instruction cycles executed in the particular routine, number of cache hits in the given routine; total number of memory reads in the given routine, total number of memory accesses (reads and writes) in the given routine, number of control bus read cycles in the given routine, number of control bus cycles (reads and writes) in the given routine, number of non-cacheable read cycles in the given routine, and total number of non-cacheable access cycles (reads and writes) in the given routine.

10. The embedded system of claim 9, wherein each of the counters is configured to respectively record statistics for a corresponding one of the performance metrics.

11. The embedded system of claim 10, wherein the bit mask is programmable.

12. An embedded system, comprising:

a microprocessor;

a memory; and performance measuring logic coupled to the microprocessor; wherein:

the microprocessor receives instructions to read a programmable bit mask from the memory, and to monitor occurrences of operations over a designated period of time responsive to the bit mask; and the microprocessor increments counters in the performance measuring logic corresponding to respective occurrences of the operations.

13. The embedded system of claim 12, wherein the operations comprise one or more of the following: overall execution time of a particular routine, number of instruction cycles executed in the particular routine, number of cache hits in the given routine; total number of memory reads in the given routine, total number of memory accesses (reads and writes) in the given routine, number of control bus read cycles in the given routine number of control bus cycles (reads and writes) in the given routine, number of non-cacheable read cycles in the given routine, and total number of non-cacheable access cycles (reads and writes) in the given routine.

14. The embedded system of claim 13, wherein the performance monitoring logic includes a plurality of counters each configured to record statistics for a corresponding one of the operations.

15. The embedded system of claim 14, wherein the microprocessor loads instructions from a first memory system and executes the instructions to read the programmable mask from a second memory system.

16. The embedded system of claim 15, wherein the first memory system is a non-volatile memory system.

17. The embedded system of claim 15, wherein the second memory is a non-volatile memory system.

* * * * *